US008345291B2

(12) United States Patent
Hosogoshi

(10) Patent No.: US 8,345,291 B2
(45) Date of Patent: Jan. 1, 2013

(54) DATA COMMUNICATION APPARATUS, CONTROL METHOD THEREOF, AND COMPUTER READABLE STORAGE MEDIUM

(75) Inventor: Hiroyuki Hosogoshi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 266 days.

(21) Appl. No.: 12/775,151

(22) Filed: May 6, 2010

(65) Prior Publication Data

US 2010/0284038 A1 Nov. 11, 2010

(30) Foreign Application Priority Data

May 11, 2009 (JP) ................................ 2009-114448

(51) Int. Cl.
*G06F 3/12* (2006.01)

(52) U.S. Cl. ........................ 358/1.15; 370/255; 370/256

(58) Field of Classification Search ........................ None
See application file for complete search history.

(56) References Cited

U.S. PATENT DOCUMENTS

| | | | | |
|---|---|---|---|---|
| 5,613,096 | A * | 3/1997 | Danknick | 709/236 |
| 6,903,830 | B1 * | 6/2005 | Hane et al. | 358/1.13 |
| 7,616,587 | B1 * | 11/2009 | Lo et al. | 370/254 |
| 2005/0050220 | A1 | 3/2005 | Rouyer | |
| 2008/0180730 | A1 * | 7/2008 | Shim | 358/1.15 |
| 2011/0044346 | A1 * | 2/2011 | Mueller et al. | 370/401 |

FOREIGN PATENT DOCUMENTS

| | | | |
|---|---|---|---|
| CN | 1946131 | A | 4/2007 |
| JP | 2004-064335 | A | 2/2004 |

* cited by examiner

*Primary Examiner* — Marivelisse Santiago Cordero
*Assistant Examiner* — John Wallace
(74) *Attorney, Agent, or Firm* — Canon U.S.A., Inc. IP Division

(57) ABSTRACT

An apparatus includes a connection unit configured to connect to a network, a switching unit configured to switch a communication speed when data communication is performed via the connection unit, and a limitation unit configured to limit switching of the communication speed to set a fixed communication speed when a connection form of the network is a specific connection form.

12 Claims, 4 Drawing Sheets

DATA COMMUNICATION APPARATUS, CONTROL METHOD THEREOF, AND COMPUTER READABLE STORAGE MEDIUM

BACKGROUND OF THE INVENTION

1. Field of the Invention

The present invention relates to a data communication apparatus that performs communication via a network, a control method thereof, and a computer readable storage medium.

2. Description of the Related Art

As a data communication apparatus that performs communication via a network, there has conventionally been known a printing apparatus that performs printing based on print data received via the network. Such a printing apparatus may have a power saving mode for reducing or stopping power supply to a printing unit or a display unit in order to reduce power consumption when no print data is received or the printing apparatus is not operated for a predetermined period of time.

In addition to the above power saving method, there is a method for reducing a processing load applied on network communication by setting a speed of communication performed via the network at low, thereby reducing power consumption (as discussed in Japanese Patent Application Laid-Open No. 2004-64335).

As a form of network establishment, there is known a spanning tree defined by the Institute of Electrical and Electronics Engineers, IEEE802.1d. As illustrated in FIG. 4, the spanning tree is used by connecting a plurality of bridges (Local Area Network (LAN) switches) between a router 4001 and a terminal (printer or personal computer (PC)). Even when one of the bridges becomes unusable due to a failure or the like, communication to the router is protected from being disabled by dynamically rewriting a routing table of the other bridges (recalculating path information). In other words, when a bridge 4003 becomes unusable, for example, abridge 4006 changes a path to the router from a path via the bridge 4003 to a path via a bridge 4005 and a bridge 4002.

In the spanning tree, when a routing table of each bridge is to be rewritten, the bridges sequentially rewrite the routing table by using a timer. During this period (until all the bridges complete rewriting of the routing tables), no communication can be performed in a sub-network including each bridge.

Thus, in the spanning tree, when a communication speed is dynamically changed as discussed in Japanese Patent Application Laid-Open No. 2004-64335, the routing tables of the bridges are to be rewritten, and hence a period may be generated in which no communication can be frequently performed via the network. As a result, a plurality of terminals in the network is even affected.

SUMMARY OF THE INVENTION

According to an aspect of the present invention, an apparatus includes a connection unit configured to connect to a network, a switching unit configured to switch a communication speed when data communication is performed via the connection unit, and a limitation unit configured to limit switching of the communication speed to set a fixed communication speed when a connection form of the network is a specific connection form.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
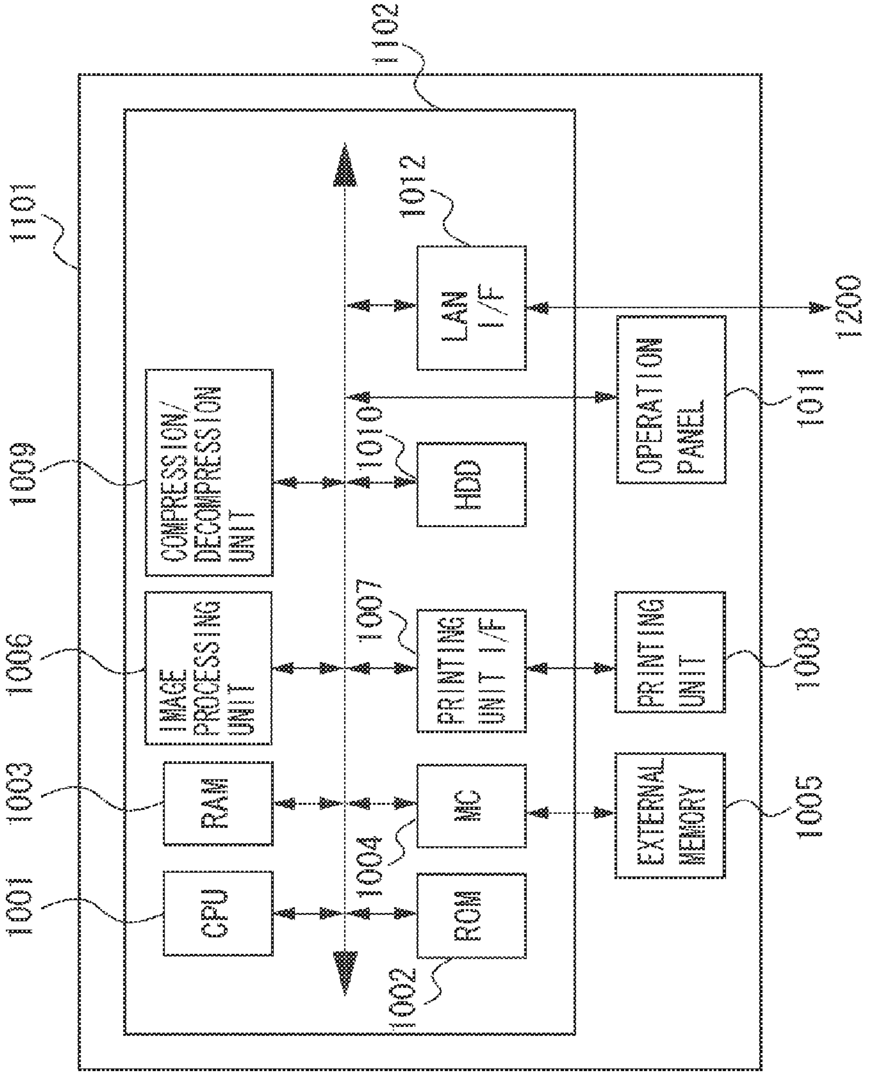
FIG. 1 is a block diagram illustrating a configuration of a data communication apparatus according to an exemplary embodiment of the present invention.

FIG. 1 is a block diagram illustrating a configuration of a data communication apparatus according to an exemplary embodiment of the present invention. As a data communication apparatus 1101 of the exemplary embodiment, an example of a printing apparatus having a printing function is illustrated. However, the data communication apparatus 1101 may be realized by an apparatus of other types (e.g., copying apparatus including a scanner function or communication apparatus including other functions).

A central processing unit (CPU) 1001 controls an overall operation of the data communication apparatus 1101 by loading a program stored in a read-only memory (ROM) 1002 onto a random access memory (RAM) 1003. The CPU 1001 is connected, via a bus, to the ROM 1002, the RAM 1003, a memory controller (MC) 1004, an image processing unit 1006, a printing unit interface (I/F) 1007, a compression/decompression unit 1009, a hard disk drive (HDD) 1010, an operation panel 1011, and a LAN I/F 1012. The CPU 1001 communicates with each of these components via the bus. These components are integrated to form a control unit 1102 in the present exemplary embodiment. However, other configurations may be employed.

The data communication apparatus 1101 operates by power supplied from an external power source. The CPU 1001 can control power supply to each component. The MC 1004 controls data writing in a detachable external memory 1005 and data reading from the external memory 1005. The image processing unit 1006 converts input image data into a format for printing by the printing unit 1008, and executes various other image processes. The printing unit I/F 1007 transfers the input image data to the printing unit 1008 to execute printing, and transfers information about a state of the printing unit 1008 to the CPU 1001. The printing unit 1008 prints an image based on the input image data on recording paper. For a printing method of the printing unit 1008, various methods such as an inkjet method and an electrophotographic method can be employed.

The compression/decompression unit 1009 decompresses input compressed image data or compresses input uncompressed image data. The HDD 1010 writes various data pieces in a built-in hard disk or reads various data pieces from the hard disk. The operation panel 1011 receives an operation from a user or displays information to be provided to the user. The operation panel 1011 can employ various configurations, for example, which can receive an operation from a user by a touch panel or a hard key, provide display on the touch panel or a display-only panel, and indicate information to the user by displaying/switching-off a lamp.

The LAN I/F 1012 controls transmission and reception of data executed via an external network (LAN 1200). The LAN I/F 1012 can execute communication based on a plurality of network protocols, and transfers a packet received via the LAN 1200 to the CPU 1001. The LAN I/F 1200 can perform data communication via the LAN 1200 at least at two kinds of communication speeds (high speed and low speed). The data communication apparatus 1101 notifies a communication destination of these communication speeds as own efficiency in negotiation when the data communication apparatus 1101 performs communication via the LAN 1200. The CPU 1001 determines which protocol the packet is based on according to contents of the received packet, and determines a connection form of the network to which the data communication apparatus 1101 is connected according to the protocol.

The data communication apparatus 1101 has a normal mode and a power saving mode as operation modes. In the normal mode, the CPU 1001 performs control so as to supply a predetermined amount of power to each component of the data communication apparatus 1101. In the power saving mode, the CPU 1001 reduces or stops power supply to apart of the components illustrated in FIG. 1 to reduce power consumption. More specifically, in the power saving mode, the CPU 1001 stops the power supply to the printing unit 1008, stops rotation of the hard disk of the HDD 1010, and switches off displaying on the operation panel 1011. Accordingly, the power consumption per unit time of the data communication apparatus 1101 is reduced.

The power consumption can be reduced by switching the data communication speed of the LAN I/F 1012 from high to low to lower a processing load on the LAN I/F 1012. Whether to perform this switching is determined based on conditions described below. The data communication apparatus 1101 changes its operation mode to the power saving mode when the operation panel 1011 is not operated by a user over a predetermined period or when print data for causing the printing unit 1008 to perform printing is not received via the LAN I/F 1012 over a predetermined period. When the operation panel 1011 is operated or when print data is received via the LAN I/F 1012 during the power saving mode, the data communication apparatus 1101 changes to the normal mode. Even when data other than print data is received via the LAN I/F 1012 during the power saving mode, the data communication apparatus 1101 does not change to the normal mode.

Next, processing for determining whether to switch a speed of communication performed via the LAN I/F 1012 to a low speed in the power saving mode will be described.

There is a spanning tree as a connection form of a network. The spanning tree is provided to enable, when any of the plurality of bridges (LAN switches) in the sub-network becomes unusable due to a failure or the like, communication via another route by dynamically rewriting the routing table of each bridge. When the routing table of each bridge is rewritten, the bridge blocks a port by using the timer for a given period, and hence communication is disabled in the sub-network. When the communication speed of the data communication apparatus 1101 is changed in the spanning tree, an address of the data communication apparatus 1101 is deleted from the routing table of the bridge, and the routing table is rewritten. This rewriting processing disables communication in the sub-network for a give period of time.

Thus, in the present exemplary embodiment, a packet received via the LAN 1200 is monitored via the LAN I/F 1012. When the packet is based on the spanning tree protocol, the data communication apparatus 1101 is determined to have been connected to the network based on the spanning tree. In this case, the communication speed is not changed (not switched to a low speed) even when the mode is changed to the power saving mode, so that occurrence of a period in which the network communication cannot be performed can be suppressed.

The packet based on the spanning tree protocol is identified, for example, by referring to a bridge protocol data unit (BPDU) that is message data of the spanning tree protocol. The BPDU is periodically transmitted and received between the bridges based on the spanning tree, and the packet identification can be realized by the LAN I/F 1012 capturing the BPDU. The packet identification is performed on a second layer (data link layer) of an open system interconnection (OSI) reference model defined by International Organization for Standardization. The identification is only an example, and other methods may be used. The CPU 1001 may identify the packet by software or hardware capable of determining a protocol.

In addition to the above identification of the received packet, identification may be performed by, for example, setting information indicating connection with the network based on the spanning tree from the operation panel 1011 and registering the information in the RAM 1003. If there is a protocol, other than the spanning tree protocol, which affects disruption of network communication due to a change in the communication speed of the data communication apparatus 100, the change of the communication speed may be limited when the data communication apparatus 1101 complies with the protocol.

Figure 2:
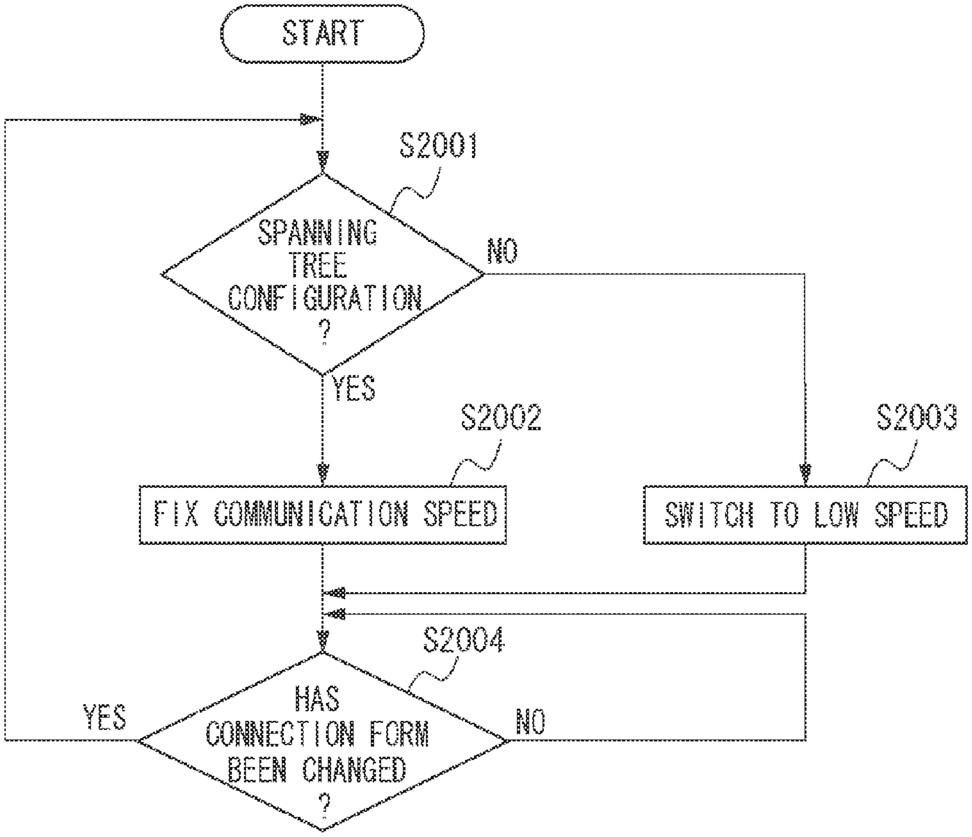
FIG. 2 is a flowchart illustrating a processing flow according to the exemplary embodiment.

FIG. 2 is a flowchart illustrating a flow of processing when contents of an operation in the power saving mode are set according to the connection form of the network to which the data communication apparatus 1101 is connected. The flowchart illustrates a flow of processing in which the CPU 1001 loads a program stored in the ROM 1002 onto the RAM 1003 to execute the program.

When power to the data communication apparatus 1101 is turned ON, in step S2001, the CPU 1001 determines the connection form of the LAN 1200 connected via the LAN I/F 1012. In this case, the CPU 1001 may determine the connection form based on contents of a received packet as described above, or information designated from the operation panel 1011 and stored in the RAM 1003. Further, the CPU 1001 determines whether the connection form is a spanning tree as a specific connection form (protocol in which a change of the communication speed causes a temporary stop of the network). Thus, the CPU 1001 determines whether the received packet is based on the spanning tree protocol, or whether information indicating a spanning tree is stored in the RAM 1003. Whether a connection form other than the spanning tree may be determined. However, an example of determining whether the connection form is the spanning tree will be described.

If the connection form is determined as the spanning tree (YES in step S2001), the processing proceeds to step S2002, and the CPU 1001 stores information indicating that the communication speed in the power saving mode is fixed (not changed) in the RAM 1003. On the other hand, if the connection form is determined not to the spanning tree (NO in step S2001), the processing proceeds to step S2003. The CPU 1001 stores information indicating that the communication speed in the power saving mode is switched to the low speed in the RAM 1003.

Thereafter, until it is determined in step S2004 that the connection form of the LAN 1200 to which the data communication apparatus 1101 is connected is changed, the CPU 1001 stores the above described information (information about the communication speed in the power saving mode) in the RAM 1003. When it is determined that the connection form is changed (YES in step S2004), the processing returns to step S1001, and the CPU 1001 repeats the above processing. In step S2004, when a network cable for connecting the LAN I/F 1012 and the LAN 1200 is inserted into and/or pulled out, the CPU 1001 determines that a change has been made if the packet received via the LAN I/F 1012 is based on another connection form. The CPU 1001 may determine a change caused by other factors. The determination that the change has been made includes a possibility of the change.

Figure 3:
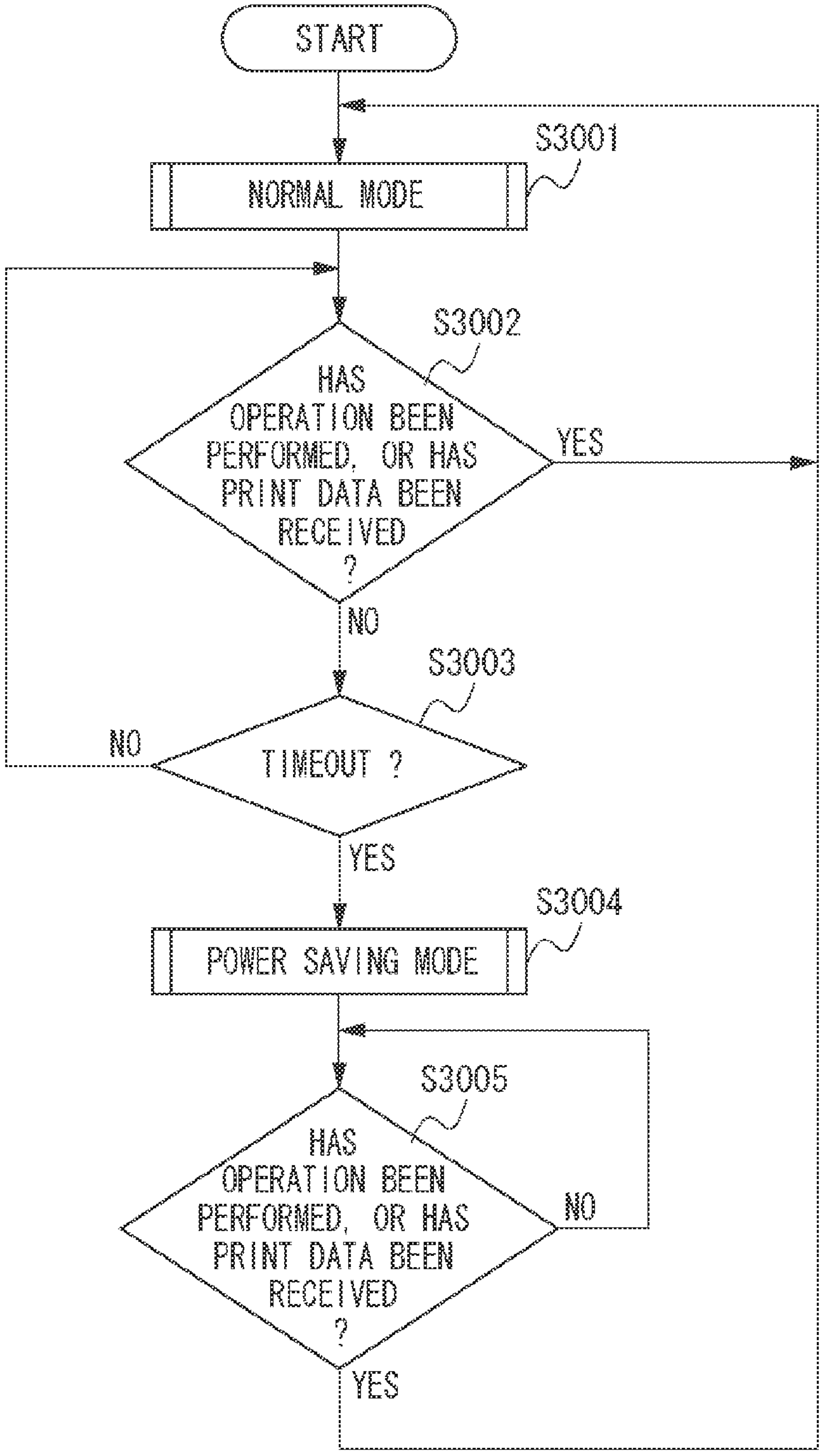
FIG. 3 is a flowchart illustrating a processing flow according to the exemplary embodiment.
Figure 4:
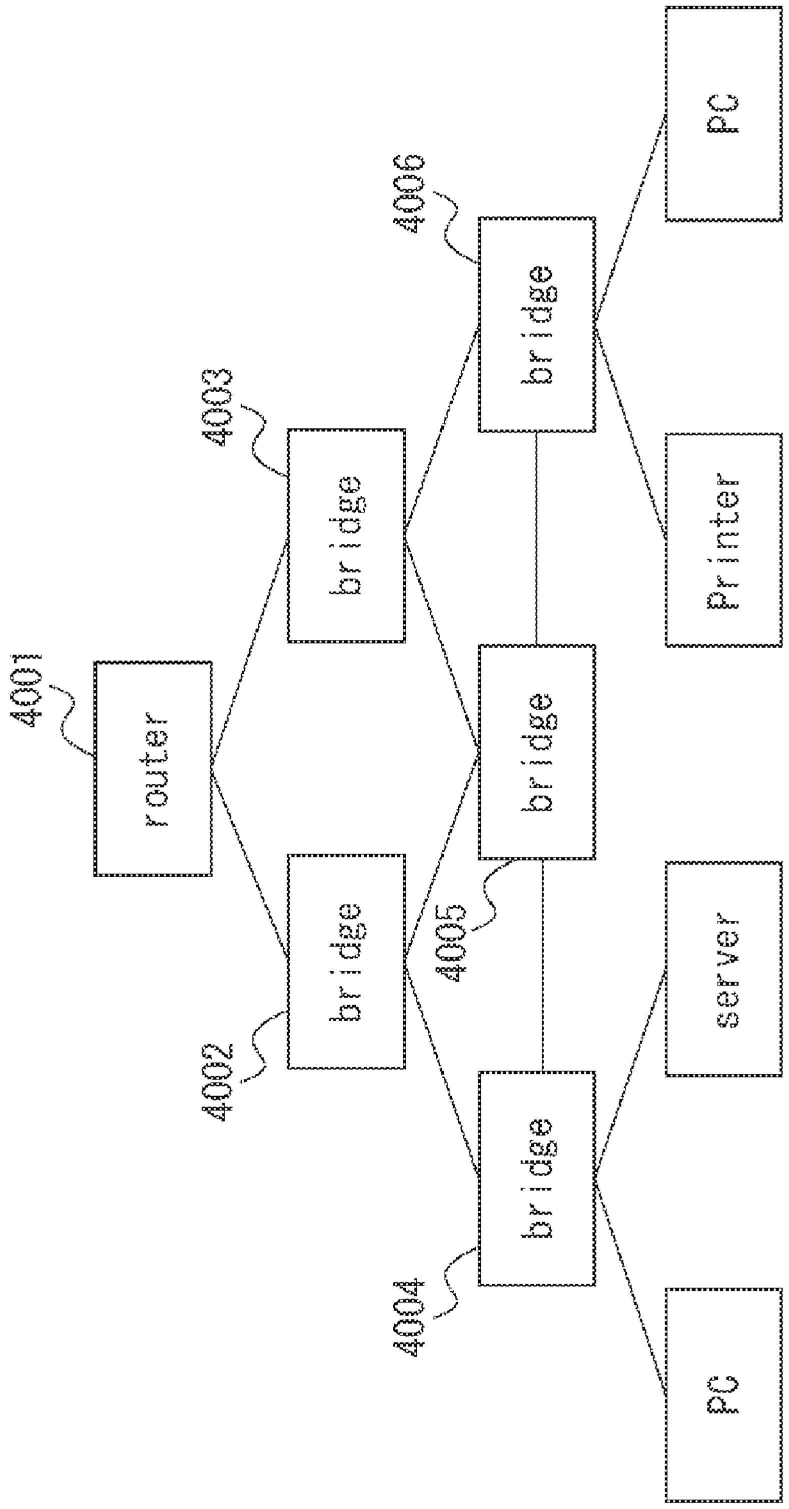
FIG. 4 illustrates a connection form of a spanning tree.

Next, a flow of processing for switching between the power saving mode and the normal mode will be described. FIG. 3 is a flowchart illustrating the flow of processing for switching between the power saving mode and the normal mode in the data communication apparatus 1101. The flowchart illustrates a flow of processing in which the CPU 1001 loads a program stored in the ROM 1002 onto the RAM 1003 to execute the program.

When the power to the data communication apparatus 1101 is turned ON, in step S3001, the data communication apparatus 1101 is set to the normal mode. In the normal mode, an amount of power supplied to each component of the data communication apparatus 1101 illustrated in FIG. 1 is set to a predetermined value or higher. The printing unit 1008 is set in an operable state, the HDD 1010 and the display unit of the operation panel 1011 are activated, and the communication speed of the LAN I/F 1012 is set to a "high speed". At this time, the data communication apparatus 1101 notifies a communication destination of the communication speed corresponding to the "high speed" as own efficiency in negotiation when the data communication apparatus 1101 performs communication via the LAN 1200.

In step S3002, the CPU 1001 monitors whether any of the keys on the operation panel 1011 is operated by the user or whether print data to execute printing by the printing unit 1008 is received via the LAN I/F 1012. If it is determined any one of these is operated (YES in step S3002), the normal mode in step S3001 is continued. In other words, the CPU 1001 executes an operation based on the operated key if it is determined that the operation panel 1011 is operated. Further, the CPU 1001 causes the printing unit 1008 to execute a printing operation based on the print data if it is determined that the print data is received. The print data received via the LAN I/F 1012 are sequentially stored in the hard disk of the HDD 1010.

The compression/decompression unit 1009 decompresses the print data. The image processing unit 1005 converts the decompressed print data into a format which can be dealt with by the printing unit 1008, and transfers the converted print data to the printing unit 1008 via the printing I/F 1007. The printing unit 1008 outputs the received print data as a visible image onto recording paper by using a recording agent (ink or toner). At this time, if there is no recording paper or recording agent, and printing cannot be executed, the CPU 1001 stores the received print data in the hard disk.

On the other hand, if it is determined that no key operation of the operation panel 1011 has been performed and no print data has been received (NO in step S3002) and predetermined time has elapsed (YES in step S3003), it is determined as a time out and the processing proceeds to step S3004. In step S3004, the data communication apparatus 1011 is set to the power saving mode. The time of the timeout is calculated from a last operation of the key on the operation panel 1011 or an end of a printing operation of the printing operation 1008, to passage of predetermined time. The predetermined time may be fixed, or designated beforehand from the operation panel 1011 and stored in the RAM 1003.

In step S3002, even if a key other than specific keys is operated, the CPU 1001 may not determine that the operation panel 1011 is operated. Further, when data (e.g., data for inquiring about a state of the apparatus) other than print data is received via the LAN I/F 1012 in step S3002, the CPU 1001 may not determine that the data is received.

In the power saving mode, power supply to each component is reduced or stopped as described above so as to reduce power consumption per unit time more than that in the normal mode. In addition, an operation frequency of the CPU 1001 may be lowered to further reduce the power consumption. Regarding the communication speed of the LAN I/F 1012, whether to change the communication speed may vary according to the connection form of the LAN 1200 to which the data communication apparatus 1101 is connected. In other words, the change is based on the information stored in the RAM 1003 in the flowchart in FIG. 2. More specifically, when the data communication apparatus 1101 is connected to the network based on the spanning tree, the communication speed is maintained high. When the data communication apparatus 1101 is connected to other networks, in the power saving mode, the communication speed is switched to a low speed to reduce the power consumption.

In other words, if the LAN 1200 is based on the spanning tree, the data communication apparatus 1101 performs various data communication at the high communication speed even in the power saving mode. If the LAN 1200 is not based on the spanning tree, the data communication apparatus 1101 performs data communication at the low communication speed in the power saving mode. If the communication speed of the LAN I/F 1012 has been switched to the "low speed", the data communication apparatus 1101 notifies a communication destination of the communication speed corresponding to the "low speed" as own efficiency in negotiation when the data communication apparatus 1101 performs communication via the LAN 1200.

In step S3005, as in the case of step S3002, the CPU 1001 monitors whether any of the keys on the operation panel 1011 is operated by the user or whether print data to execute printing by the printing unit 1008 is received via the LAN I/F 1012. If it is determined any one of these is operated (YES in step S3002), the processing proceeds to step S3001, and the CPU 1001 switches the operation mode to the normal mode. At this time, if the LAN 1200 is not based on the spanning tree, the communication speed is changed (from low to high). More specifically, if a printing request is received from the PC on the LAN 1200 (YES in step S3005), the communication speed of the LAN I/F 1012 is switched to the high speed, and subsequent print data are received in a high-speed mode. If the LAN 1200 is based on the spanning tree, the communication speed is set high during the power saving mode, and hence the amount of power supply to each component is increased without performing any communication speed switching.

Thus, in the present exemplary embodiment, whether to change the communication speed of the LAN I/F 1012 between the power saving mode and the normal mode is switched according to the connection form of the LAN to which the data communication apparatus 1101 is connected. Accordingly, occurrence of a temporary stop of the LAN caused by the communication speed of the data communication apparatus 1101 can be prevented. On the other hand, if the LAN 1200 is not based on the spanning tree, the communication speed is switched to the low speed during the power saving mode, and hence power can be saved more. The connection form of the LAN is constantly monitored. Therefore, the connection form is appropriately determined when the data communication apparatus is connected over again to the LAN, and corresponding processing can be performed.

Switching to the power saving mode may be based on, in addition to the condition that no operation has been performed or no print data has been received over the predetermined time period as described above, a condition that a key for instructing switching to the power saving mode is operated from the operation panel 1011. Further, not only the case where the data received via the LAN I/F 1012 is the print data, but also reception of other specific data may be set as a condition.

In the above described exemplary embodiment, when the LAN 1200 is a network based on the spanning tree or the like in which the change of the communication speed causes a network stop, the change of the communication speed when switching to the power saving mode is limited. However, the change of the communication speed may be limited not only because of switching to the power saving mode but also for other reasons.

The present exemplary embodiment is described by taking the example of the printing apparatus as the data communication apparatus. However, the data communication apparatus is not limited to the printing apparatus, and any other apparatus may be used as long as it can be connected to a network. For example, in a server apparatus that stores data received via the network in a memory such as a hard disk, when the apparatus is connected to the network based on the spanning tree, a change of a communication speed is limited.

According to the present exemplary embodiment, when communication is performed according to a specific protocol, a change of a communication speed is suppressed. Thus, occurrence of a status in which network communication cannot be performed can be reduced.

As described above, the present invention can be achieved by supplying a storage medium recording program codes of software for realizing the functions of the exemplary embodiment to a system or an apparatus, and reading and executing the stored program codes by a computer (CPU or MPU). In this case, the program codes themselves read from the storage medium realize novel functions of the present invention, and the storage medium storing the program codes constitutes the present invention. Thus, any form of programs can be employed as long as program functions are provided, such as object codes, a program executed by an interpreter, or script data supplied to an operating system (OS). A part or all of processing executed by the program may be replaced by hardware (electric circuit).

The program executed in the data communication apparatus may be executed by one CPU, or by a plurality of CPUs associated with each other. Software and hardware may be appropriately combined to execute processing. The program may be executed by a CPU of an apparatus installed outside the data communication apparatus, in place of the CPU in the data communication apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-114448 filed May 11, 2009, which is hereby incorporated by reference herein in its entirety.

What is claimed is:

1. An apparatus comprising:

a connection unit configured to connect to a network;

a switching unit configured to switch a communication speed when data communication is performed via the connection unit;

a determination unit configured to determine whether the apparatus performs the data communication under a spanning tree protocol;

a setting unit configured to set the apparatus to a normal mode or a power saving mode;

and a limitation unit configured to limit switching of the communication speed to set a fixed communication speed in a case where the determination unit determines the apparatus performs the data communication under the spanning tree protocol, wherein the switching unit allows switching the communication speed in a case where the determination unit determines the apparatus does not perform the data communication under the spanning tree protocol; and wherein the switching unit switches the communication speed to a low speed in a case where the determination unit determines the apparatus does not perform the data communication under the spanning tree protocol and the setting unit sets the apparatus to the power saving mode.

2. The apparatus according to claim 1, further comprising a printing unit configured to print an image based on input print data, wherein the setting unit sets the apparatus to the normal mode when the print data is received, and to the power saving mode when no print data is received over a predetermined period.

3. The apparatus according to claim 1, further comprising an operation unit configured to input an operation, wherein the setting unit sets the apparatus to the normal mode when the operation is performed, and to the power saving mode when no operation is performed over a predetermined period.

4. The apparatus according to claim 1, wherein the determination unit determines that the apparatus performs the data communication under the spanning tree protocol based on information indicating the spanning tree is stored in a memory.

5. A method for controlling an apparatus connected to a network, the method comprising:

switching a communication speed when the apparatus performs data communication via the network;

determining whether the apparatus performs the data communication under a spanning tree protocol; and setting the apparatus to a normal mode or a power saving mode;

limiting switching of the communication speed to set a fixed communication speed in a case where it is determined that the apparatus performs the data communication under the spanning tree protocol; and allowing the switching of the communication speed in a case where it is determined that the apparatus does not perform the data communication under the spanning tree protocol, wherein the switching switches the communication speed to a low speed in a case where it is determined that the apparatus performs the data communication under the spanning tree protocol and the setting sets the apparatus to the power saving mode.

6. The method according to claim 5, further comprising printing an image based on input print data, wherein the setting sets the apparatus to the normal mode when the print data is received, and to the power saving mode when no print data is received over a predetermined period.

7. The method according to claim 5, further comprising inputting an operation, wherein the setting sets the apparatus to the normal mode when the operation is performed, and to the power saving mode when no operation is performed over a predetermined period.

8. The method according to claim 5, wherein it is determined that the apparatus performs the data communication under the spanning tree protocol based on information indicating the spanning tree is stored in a memory.

9. A non-transitory computer readable storage medium for storing a computer executable program to control an apparatus connected to a network, the program comprising:

switching a communication speed when the apparatus performs data communication;

determining whether the apparatus performs the data communication under a spanning tree protocol;

setting the apparatus to a normal mode or a power saving mode;

limiting switching of the communication speed to set a fixed communication speed in a case where it is determined that the apparatus performs the data communication under the spanning tree protocol; and allowing the switching of the communication speed in a case where it is determined that the apparatus does not perform the data communication under the spanning tree protocol;

wherein the switching switches the communication speed to a low speed in a case where it is determined that the apparatus performs the data communication under the spanning tree protocol and the setting sets the apparatus to the power saving mode.

10. The non-transitory computer readable storage medium according to claim 9, further comprising printing an image based on input print data, wherein the setting sets the apparatus to the normal mode when the print data is received, and to the power saving mode when no print data is received over a predetermined period.

11. The non-transitory computer readable storage medium according to claim 9, further comprising inputting an operation, wherein the setting sets the apparatus to the normal mode when the operation is performed, and to the power saving mode when no operation is performed over a predetermined period.

12. The non-transitory computer readable storage medium according to claim 9, wherein it is determined that the apparatus performs the data communication under the spanning tree protocol based on information indicating the spanning tree is stored in a memory.

* * * * *